(12) United States Patent
Juarez, Jr.

(10) Patent No.: US 11,526,829 B1
(45) Date of Patent: Dec. 13, 2022

(54) BUSINESS MANAGEMENT SYSTEMS FOR ESTIMATING FLIGHT EVENT RISK STATUS OF AN EMPLOYEE AND METHODS THEREFOR

(71) Applicant: Michael Gilbert Juarez, Jr., Daly City, CA (US)

(72) Inventor: Michael Gilbert Juarez, Jr., Daly City, CA (US)

( * ) Notice: Subject to any disclaimer, the term of this patent is extended or adjusted under 35 U.S.C. 154(b) by 0 days.

(21) Appl. No.: 17/351,808

(22) Filed: Jun. 18, 2021

(51) Int. Cl.
| | | |
|---|---|---|
| *G06Q 10/06* | (2012.01) | |
| *G06F 40/40* | (2020.01) | |
| *G06Q 10/10* | (2012.01) | |

(52) U.S. Cl.
CPC ....... *G06Q 10/06398* (2013.01); *G06F 40/40* (2020.01); *G06Q 10/06393* (2013.01); *G06Q 10/105* (2013.01)

(58) Field of Classification Search
CPC ....... G06Q 10/06393; G06Q 10/06398; G06Q 10/0635; G06Q 10/1053; G06N 20/00
See application file for complete search history.

(56) References Cited

U.S. PATENT DOCUMENTS

| | | | | |
|---|---|---|---|---|
| 9,852,400 | B2* | 12/2017 | Ruan ..................... | G06Q 10/107 |
| 10,339,483 | B2* | 7/2019 | Varghese ............ | G06Q 10/0635 |
| 10,521,748 | B2* | 12/2019 | Beck ................... | G06Q 10/0635 |
| 2004/0158487 | A1* | 8/2004 | Miles ................ | G06Q 10/06398 |
| | | | | 705/7.42 |
| 2013/0166358 | A1* | 6/2013 | Parmar ............ | G06Q 10/06393 |
| | | | | 705/7.39 |
| 2015/0186817 | A1* | 7/2015 | Kim ................... | G06Q 10/0635 |
| | | | | 705/7.28 |
| 2016/0196511 | A1* | 7/2016 | Anisingaraju ......... | G06Q 50/01 |
| | | | | 705/7.11 |
| 2017/0236081 | A1* | 8/2017 | Grady Smith ..... | G06Q 10/0637 |
| | | | | 705/7.36 |
| 2019/0121855 | A1* | 4/2019 | Alexander ............ | G06F 16/248 |
| 2021/0064984 | A1* | 3/2021 | Wang ....................... | G06N 3/08 |
| 2021/0089979 | A1* | 3/2021 | Beck ...................... | G06Q 50/01 |
| 2021/0241327 | A1* | 8/2021 | Childress ......... | G06Q 10/06398 |

OTHER PUBLICATIONS

A. Mhatre, A. Mahalingam, M. Narayanan, A. Nair and S. Jaju, "Predicting Employee Attrition along with Identifying High Risk Employees using Big Data and Machine Learning," 2020 2nd International Conference on Advances in Computing, Communication Control and Networking (ICACCCN), 2020, pp. 269-276 (Year: 2020).*

S Yadav, A. Jain, D. Singh, "Early Prediction of Employee Attrition using Data Mining Techniques," IEEE 2018 (Year: 2018).*

* cited by examiner

*Primary Examiner* — Johnna R Loftis
(74) *Attorney, Agent, or Firm* — Lloyd & Mousilli PLLC

(57) ABSTRACT

Business management systems include business system platforms such as project management trackers, employee engagement software and so on. The system obtains inputs about an employee from at least one business system platform and estimates flight event risk status of the employee. Feedback is obtained from to make adjustments or corrections to the flight event risk status. The estimation involves the use of machine learning regression model that includes historical data and will also constantly update itself based on the feedback and the updated flight event risk status. The system also includes a tone analyzer to analyze the tone of messages posted by groups of employees in an organization. The groups of employees may belong to a business vertical, members of a club, project team, or the entire organization.

15 Claims, 10 Drawing Sheets

FIG. 4A

Salem Orie
@salemorie
November 24, 2020 10:24 AM

I'm telling you, i'm really feeling frustrated right now, i don't get why it says it's only at 150, but it is growing I guess.

Blake Wonder
@blakewonder
November 24, 2020 9:59 AM

I go so much work right now. Anyone wanna volunteer their time, lol???

Salem 6:04 PM
Highlights of Obama's New Memoir

Amari 6:04 PM
Biden Insists Lack Of Cooperation From Trump Adminiatration Won't Interfere With 4 Years Of Total Political Inaction Amari 6:04 PM
Trevor Lawrence Inundated With Annoying Letters From Alumni Association Seeking Antibody Donations Tatum 6:04 PM
Nurse Hoping That Extra-Comfy ICU Bed Free When She's Admitted As Patient In 2 Weeks Rory 6:04 PM
Covid Denier Struggling To Protest State's Incoherent, Constantly Changing Coronavirus Policies Rory 6:04 PM
New Study Reveals Majority Of Memory Lapses Brought On By Visiting Government Black Site Tatum 6:04 PM
Alaska Airlines Jetliner Strikes Brown Bear During Landing Message

FIG. 5A

BUSINESS MANAGEMENT SYSTEMS FOR ESTIMATING FLIGHT EVENT RISK STATUS OF AN EMPLOYEE AND METHODS THEREFOR

TECHNICAL FIELD

The present specification generally relates to business management systems, more particularly, to business management systems, methods and computer readable media for employee engagement.

BACKGROUND

Employee engagement is a measure of how engaged an employee is with their employer or job, or how psychologically committed to it he/she is towards the job. This is now a very important aspect of an organization as more and more organizations' value is vested within the human capital, and consequently losing employees would result in value erosion. On the employees' side, they are now empowered, and incentivized to seek better opportunities for themselves. Hence, frequent job changes no longer are stigmatized, and indeed in many industry sectors are quite commonplace. Employee engagement goes hand in hand with retention, which is critical in several market sectors, while the loss of even a small number of the wrong people to a competitor can inflict millions of dollars of damage or worse.

Hiring and retaining an employee in an organization is one side of things. Subsequently, maintaining the energy levels of an employee high to keep them highly productive is a challenge that most organizations face. Having a measure of energy levels and being able to identify sagging energy levels would be highly valuable to any organization.

Employees who are identified as a possibility to leave the organization to join a competitor are generally known as "flight risks" by human resources, managers, and management of the organization. Despite the tremendous efforts on the part of everyone involved to keep the employees engaged and energized, when employees do leave the organization, most often the managers are surprised by their decisions.

Employee engagement and managing employees' energy levels within an organization is a subject of great interest, but one that has not been adequately addressed so far. Several aspects of this have been dealt with in bits and pieces. For example, project management has quite often been used as a surrogate for employee engagement, and even energy. But this has found to be a very poor way of measuring, as quite often, even disgruntled employees find ways to deliver projects on time. Also, there is no proper way to identify an employee who is on the path to a burnout. There is a need in the art for methods and systems to identify employee engagement levels with a view to identify potential flight risks by estimating each of their energy levels.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a business management system to evaluate employee engagement score and estimate flight event risk status in an organization. The system includes a business system platform, a tone analyzer to analyze tone of messages posted by at least one employee, and a user interface that allows inputting and visualizing information on the business system platform and the tone analyzer. The business system platform comprises a feedback tool to obtain feedback from the at least one employee.

Certain embodiments disclosed herein also includes a method of estimating flight event risk status of an employee, the method includes taking inputs about an employee from a business system platform, estimating an employee engagement score based on data from the business system platform, obtaining feedback on the employee engagement score f the employee, and estimating a flight event risk status based on the feedback.

Certain embodiments disclosed herein further includes A non-transient computer readable medium for performing a method of estimating flight event risk status of an employee, the method includes taking inputs about an employee from a business system platform, estimating an employee engagement score based on data from the business system platform, obtaining feedback the employee engagement score from the employee and estimating a flight event risk status based on the feedback.

DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 4A shows a partial user dashboard of the user interface in the business management system, according to an embodiment;

FIG. 5A shows a partial chat tone analysis dashboard of the user interface in the business management system, according to an embodiment;

DETAILED DESCRIPTION

Figure 1:
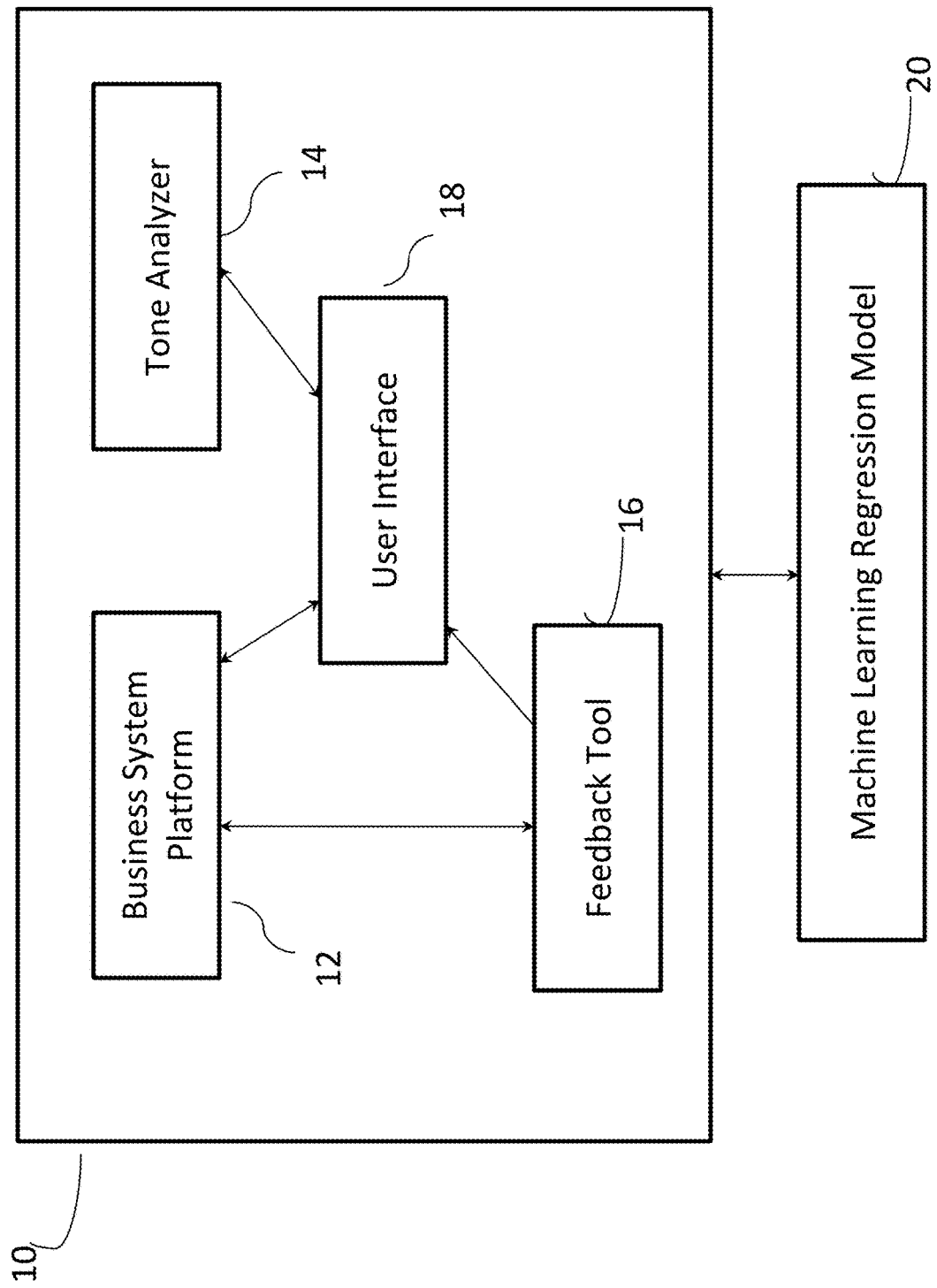
FIG. 1 is a block diagrammatic representation of the business management system, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The Various Disclosed Embodiments

The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the term "or" is generally employed in its sense including "and/or" unless the content clearly dictates otherwise.

Engagement as used herein can be seen as the degree of psychological commitment that employees have to their organization. This definition is along the lines of the definition of engagement in the human capital management related areas.

Among other things, the embodiments may be implemented in whole or in part as a system, as one or more methods, or as one or more devices. Also, the embodiments may take the form of a hardware, a software, or a combination of both software and hardware. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

As noted herein, in an embodiment, a business management system is provided. The business management system can be used to assess the health and well being of each employee in an organization as well as groups of employees, such as those belonging to a certain vertical, a business division, a club, and the like, and combinations thereof.

Thus, the business management system is capable of assessing organization health and well being as a whole. This helps an organization in many different ways, some of which may include, ensuring that the organization is on its path to meet its goals, customer satisfaction, organizational stability, and so on.

That is, certain embodiments disclosed herein include a business management system to estimate an employee engagement score and a flight event risk status of an employee. The system comprises a business system platform, which includes a cognitive analysis application incorporating Artificial Intelligence (AI). The business system platform is used to estimate an employee engagement score in real time or near real time, based on data obtained from the business system platform that serve as key inputs in the business management system. The system then includes a feedback tool that is configured to receive a feedback on the employee engagement score from the employee. The feedback obtained is used to estimate the flight event risk status. The system further includes a tone analyzer to analyze the tone of messages within a group or a team or a club where the employee belongs. A machine learning regression model is used to make the estimations, which is constantly updated.

Certain embodiments disclosed herein also include a method for implementing the system as disclosed. The method involves taking inputs about an employee from a business system platform including the automated consumption of data from existing business management software, and utilizing the data as key inputs based on which an employee engagement score value is estimated. Subsequently, feedback is obtained from the employee on the employee engagement score, which is then used to estimate a flight event risk status.

Certain embodiments disclosed herein include a computer implemented tool to implement the steps involved in the method as disclosed.

Further, the business management system of the embodiments belongs to a class of emerging software applications that utilize AI to undertake complex cognitive tasks that uses new and emerging methods to approach complex problems associated with identifying potential risks related to employees' disengagement and their flight risks in a simplified and automated manner. The inputs for the novel methods may be from existing commercially available business system platforms such as Asana, Trello, Jira etc., but the estimations are done based on AI to arrive at more accurate estimations that in turn lead to meaningful and actionable outputs to the relevant personnel in an organization.

FIG. 1 is a block diagrammatic representation of the business management system 10, according to an embodiment. The business management system 10 includes a business system platform 12. Some exemplary business system platforms include, for example, but not limited to, a cognitive analysis application incorporating Artificial Intelligence (AI). Some commercially available business system platforms include Asana, Trello, Jira, and the like, and combinations thereof. Few exemplary factors that such business system platforms take into account while evaluating productivity, efficiency, and other measures include time taken for a project, number of projects, comparison of time taken by an employee versus the average time taken by the team, month-on-month or quarter-on-quarter comparison of employee performance etc. Still further factors taken into consideration would be the complexity of the project undertaken, quality of inputs towards a project, blockages, quality of outputs, and the like.

The business management system 10 is used to estimate an employee engagement score based on data made available from business system platform 12. The estimation of employee engagement score is achieved in an automated manner using data from the business system platform as key inputs. Subsequently, the estimated employee engagement score may be presented as a numeric value.

In one exemplary embodiment, an employee who was completing projects well ahead of schedule but has subsequently been missing deadlines will be considered being "disengaged". This would mean that the employee is not sufficiently motivated and may choose to look for opportunities elsewhere. This may further be corroborated by other factors such as but not limited to, quality of outputs, and so on.

The business management system 10 also includes a feedback tool 16, wherein feedback on the assessments and evaluations obtained from the business system platforms can be obtained and used to update the employee engagement score that is used to further assess employee flight risk, as described in more detail below. The feedback is obtained from the employees. These feedbacks are sometimes known in the art as "Mood Posts", as it adequately captures the employee's mood while providing the feedback. The feedback may include comments on the assessment, a "liked" response type feedback (that includes feedback such as Strongly Agree, Somewhat Agree, Neutral, Somewhat Disagree, Strongly Disagree), corrections to any feedback and evaluations, and so on.

The feedback on the estimated employee engagement score is used to estimate a flight event risk status. The flight event risk is visualized as a status for each employee by the relevant personnel in an organization. The status may be represented in many different ways known in the art, such as but not limited to, red flag to indicate a flight event risk and green flag to indicate not a flight event risk, ratings on a suitable ratings scale system such as Numeric Rating Scale (NRS), Verbal Rating Scale (VRS), Visual Analogue Scale (VAS), Likert scale, Graphic rating scale, Descriptive graphic rating scale, and the like, and combinations thereof.

Often times, it may be recognized that there is a direct correlation between flight event risk status and employee engagement score, but sometimes they may be correlated. Employee engagement score is a real-time or near real-time scoring system, that reflects, based on certain assumptions, how much an employee is personally engaged with their work. Risk is a predictive score, and it has a particular purpose, which is separate from that of engagement. One may view employee engagement score as an estimation based on historical data up to the current time, and hence it may be used to look at the present, while flight event risk status is a predictive value and is used to look at potential future actions of an employee.

The business management system 10 includes a machine learning predictive regression model 20 that enables rapid and accurate prediction of the flight event risk status of an employee. The feedback and correction data is used to train the machine learning models in order to ensure greater accuracy. Other modeling methods and techniques, including statistical analysis, construction of a mathematical model, construction of a neural network, pattern matching, and so on, may also be applicable in the system of the embodiment.

The business management system 10 can be run on a periodic basis, such as daily, weekly, fortnightly, monthly, and so on. Alternately, a time assessment of one or more specific employees can be conducted, which would also include getting their feedback.

The business management system 10 also includes a tone analyzer 14 that is used to sense the tone of the conversations taking place within an organization's chat programs.

Tone can be seen as how a particular message was conveyed as opposed to what was conveyed by a message. It is generally a property of text that does not contribute content to the utterance. In written language, tone is often captured by non-lexical cues that pertain to the form in which the message was delivered. For example, the use of uppercase letters, emoticons, non-typical use of punctuation marks, repetition of letters and/or words, and the like. Some verbal clues to pick up tone of a message include but are not limited to interjections ("wow", "ugh"), discourse markers ("oh well"), and the like.

As an exemplary situation in a typical organization, the engaged employee generally won't comment on how happy he/she is, or even necessarily compliment the management or the company. It is quite possible that he/she is too busy thinking about his/her work. When they do feel the need to express their problem, highly engaged employees may cite problem after problem because they are very focused on continuous improvement. A disengaged employee, on the other hand, may not make any direct negative comment about the organization, instead, their text is likely to very much center on their own personal experience rather than on the organization more broadly. A disengaged employee is less likely to frame thoughts as "problems and solutions" but rather as a set of disappointments, violated expectations, or other negative emotions. As such, they are much likelier to use first-person frequently—often singular but sometimes plural so as to make the view seem less individual—than are other commenters. For example, such a person is far more likely to say, "It doesn't matter how well I do my job" as opposed to "ABC Company is a horrible employer." Thus, in some embodiments, disappointment is detected via the use of first-person and direct action verb in conjunction with negative polarity language.

In an embodiment, the tone analyzer 14 involves the use of some business communication systems or communication program such as email programs, chat programs, and the like, and combinations thereof. Useful email programs include Microsoft® Outlook, Mozilla Thunderbird, Apple Mail, and the like. Exemplary chat programs that may be used include, for example, Slack, Discord, Sametime (IBM Lotus Instant Messaging & Web Conferencing) and the like. Exemplary classification of the tone of the chats may be anger, analytical, sadness, tentative, joy, confident, and fear.

Most embodiments that have user interface UI's will offer visualizations that can be used to depict it to the respective member of the organization. An exemplary visual depiction may be through the use of emoticons (smiley face, sad face, neutral face etc.), matrix view visualizations (each matrix provides data for a specific team or vertical such as location or seniority), mood cloud visualizations (top 5 frequently used words and phrases are suitably visualized with color coding to convey the tone), etc. As used herein, user interface 18 is part of the business management system of the business management system 10. However, it should be noted here that the UI is not specific to any one business communication system or any one business system platform.

In an embodiment, tools such as Natural Language Processing (NLP) may be used in the tone analyzer 14 also to enable accurate assessment of the tone of chats.

The tone analyzer 14 is configured to be used by anonymizing all the chats before analyzing. The tone analyzer 14 will then provide a tone of the chats of a particular group of employees, which in turn provides a measure of the employees' health and well being. This can then be used to cross verify the flight event risk status of the employee. Anonymizing chats before analyzing ensures no specific employee is targeted by someone else such as a manager or a peer.

Thus, mental health and well being of a particular employee can be assessed which can then be corroborated by analyzing tone of chats of the group or the organization in general. Both these assessments are made by the use of tools in the system that have been strengthened through the use of machine learning regression models, which is constantly updated and enhanced with data and feedback. The business management system 10 can then be used to understand the stress levels of each employee or how disengaged an employee is with respect to organizational goals. In an embodiment, the system can also be used to identify the factors that lead to stress at an individual level as well as at a group or team level, and even at an organizational level. Alternately, the factors that motivate or energize the team can also be identified using the system. The analysis, assessment, estimation and feedback can be done on a periodic basis, or in a very timely manner by identifying a particular employee's "breaking point". The system may include trigger warning systems to the respective member of the organization, such as a human resource manager, a reporting manager, and the like, or to all of them. Accordingly, timely intervening actions can be taken to improve employee engagement by ensuring employee well being.

Figure 2:
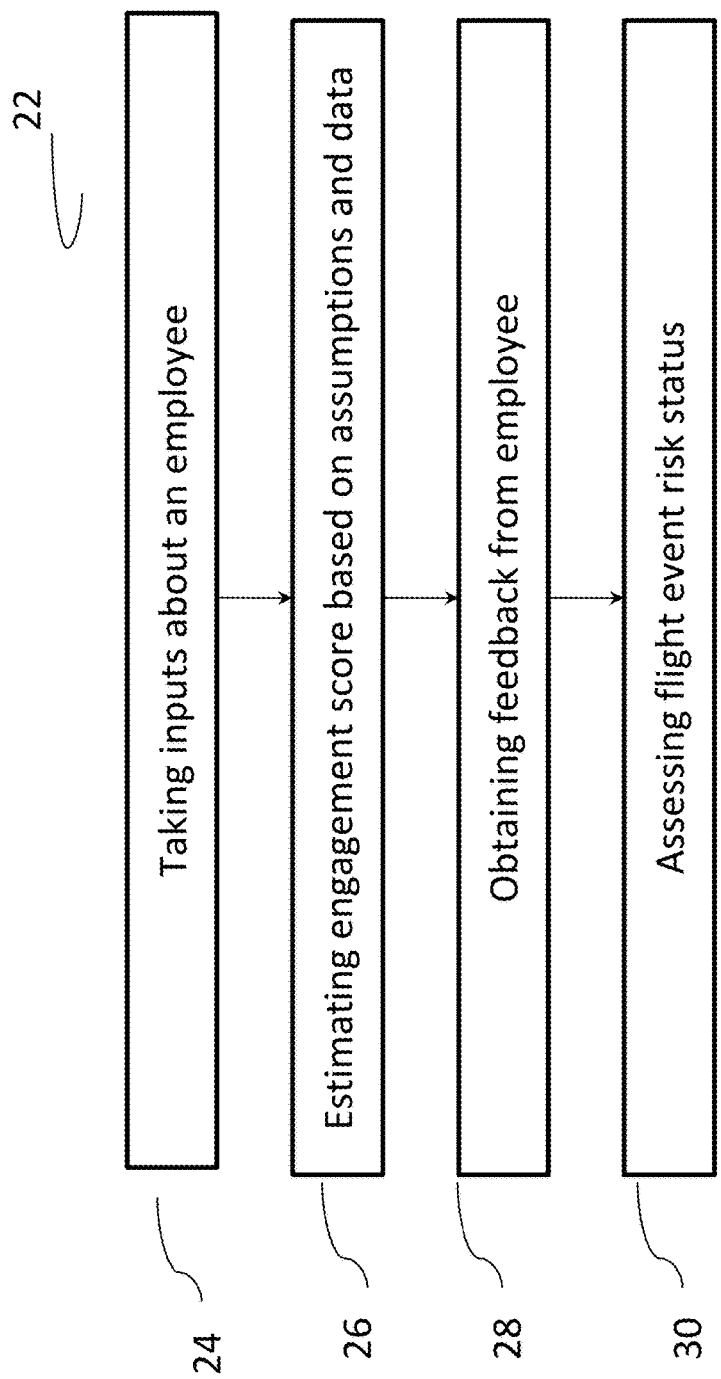
FIG. 2 is a flowchart representation of the steps involved in the method, according to an embodiment.

In another embodiment, a method of estimating flight event risk status of an employee may be provided. FIG. 2 is a flowchart representation of the steps involved in the method, generally represented by numeral 22. The method includes taking inputs from one or more business system platform about an employee, shown in step 24. Here, the exemplary management used may include applications including Jira, Trello, Asana, Teams, and the like. In step 26 an engagement score is estimated based on the data from the business system platform as key inputs. That is, a scoring system may be used to determine specific factors that contribute to the overall flight risk prediction. In one embodiment, this may include the calculation of values based on certain base assumptions and existing data inputted or gathered about the employee. The estimated employee engagement score from the business system platform is provided to the employee who will then give feedback as seen in step 28. The feedback is then fed back into the business system platform to adjust base assumptions made about the employee, and estimate a flight event risk status of the employee, as shown in step 30. In an embodiment, the flight event risk status may also estimated based on a machine learning regression model, which involves updating the model with data thus allowing the machine to learn and improve constantly.

In another embodiment, from communication systems (Trello, Discord), and internal application feedback (e.g., employee's "Mood Posts" within the messages), may also be used as factors into the employee engagement score and, eventually be used to assess an employee's flight risk.

As noted herein, the methods and systems of the various embodiments are best implemented through a computer that is programmed to perform the method steps as described herein. The computer program may be implemented as web-based interface. The computer includes at least one memory unit that stores data related to the employees, groups, teams, clubs, business verticals, and the organization as a whole. The computer further includes preferably a separate memory unit that houses the machine learning linear regression model that is allowed to access the data in the first memory unit. The data is processed by the machine learning regression model to estimate the flight event risk status, as well as to update the model itself with new data. The memory units may be made available as part of the computer itself, or it could be a cloud storage unit. As used herein, computer programs also include applications being developed for this purpose. Programs and applications can be built to be device independent and can run on any OS, such Windows, iOS, Android, MacOS, and so on.

Figure 3A:
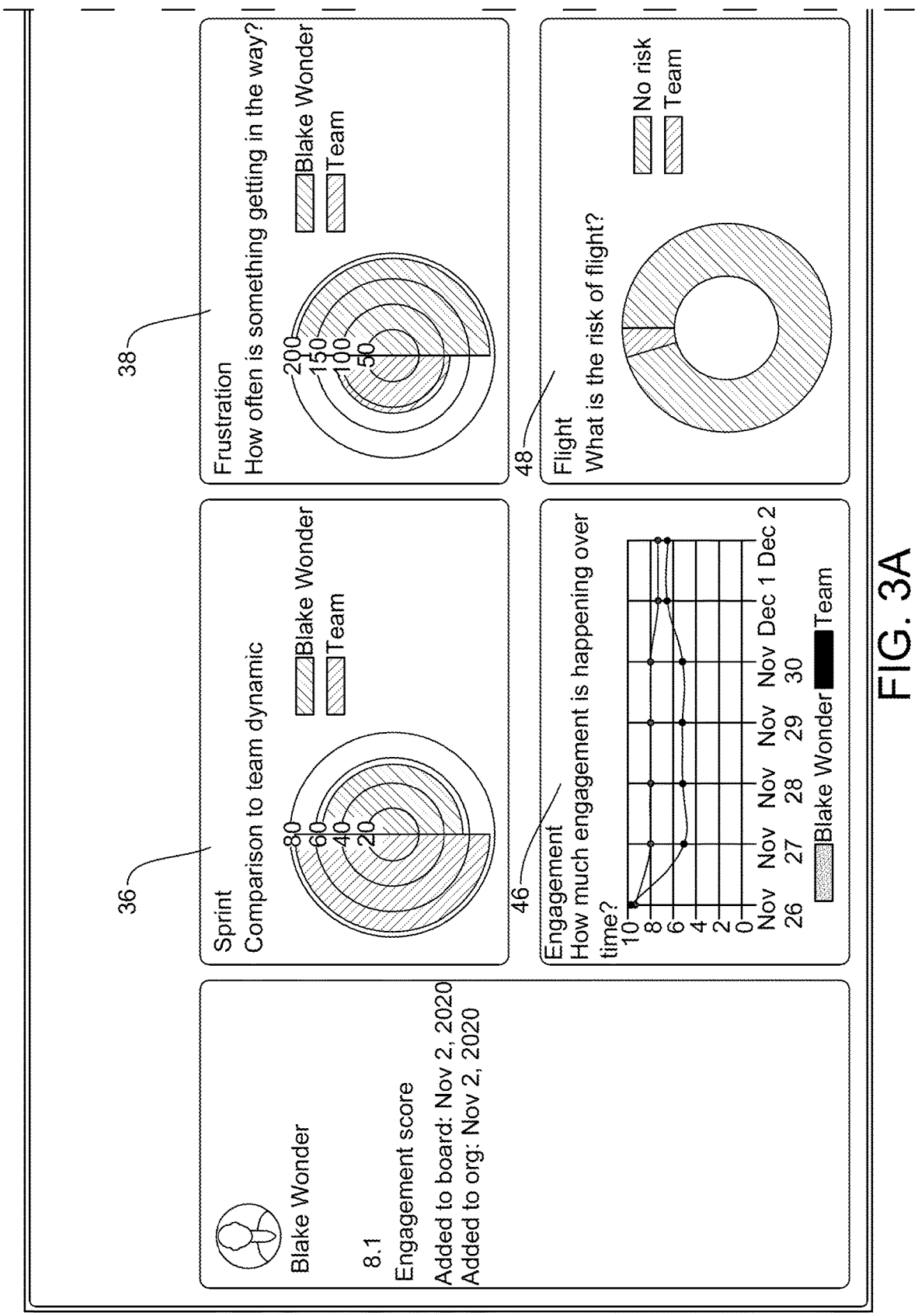
FIG. 3A shows a partial admin dashboard of the user interface in the business management system, according to an embodiment.
Figure 3B:
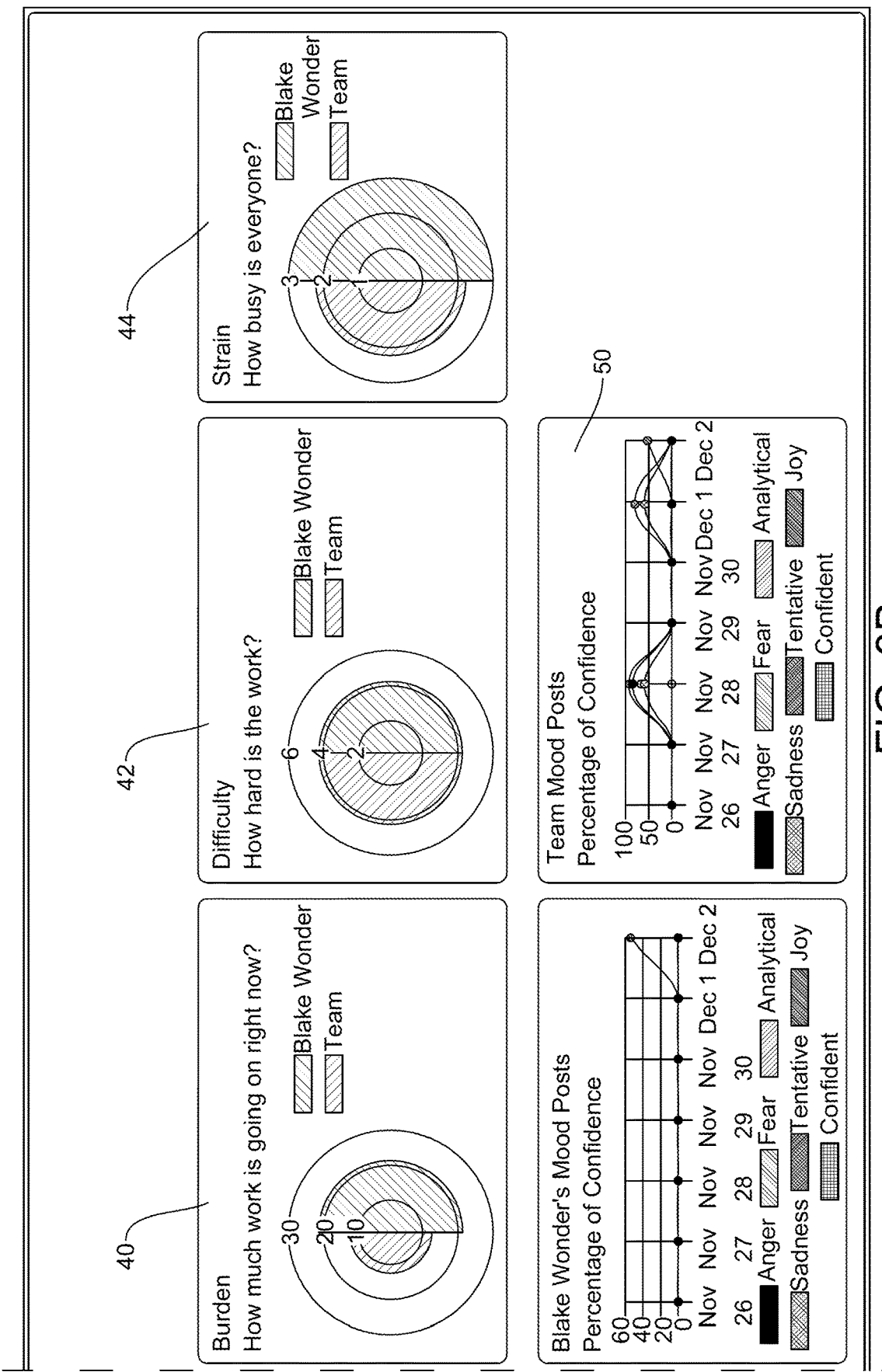
FIG. 3B shows a partial admin dashboard of the user interface in the business management system, according to an embodiment.

The user interface of the application consists of three components. An administrative dashboard provides insight into each member of the team who also belongs to a specific project management system. The administrative dashboard is typically accessible by human resource managers, team leaders, project managers, and management of the organization. In an exemplary embodiment, the dashboard as shown in FIGS. 3A and 3B provides insights into eight categories:

Sprint (36): The average time per project of a member compared to the team.

Frustration (38): The amount of time where a project runs into interference from inside the organization.

Burden (40): The average amount of work that a member is doing compared to the team.

Difficulty (42): The average complexity of a member's projects compared to the team.

Strain (44): The number of projects that a member is tasked with compared to the team.

Engagement (46): A numeric score based on the above five factors.

Flight (48): A value calculated by linear regression analysis machine learning models which predict flight event risk, such as quitting a job, or reaching such a high level of disengagement that happiness and personal satisfaction start to fall.

Tone Analysis (50): An analysis on social feedback posts using natural language processing. Social feedback posts are open to all members of the team, and should not be considered private forms of communication.

Figure 4A:
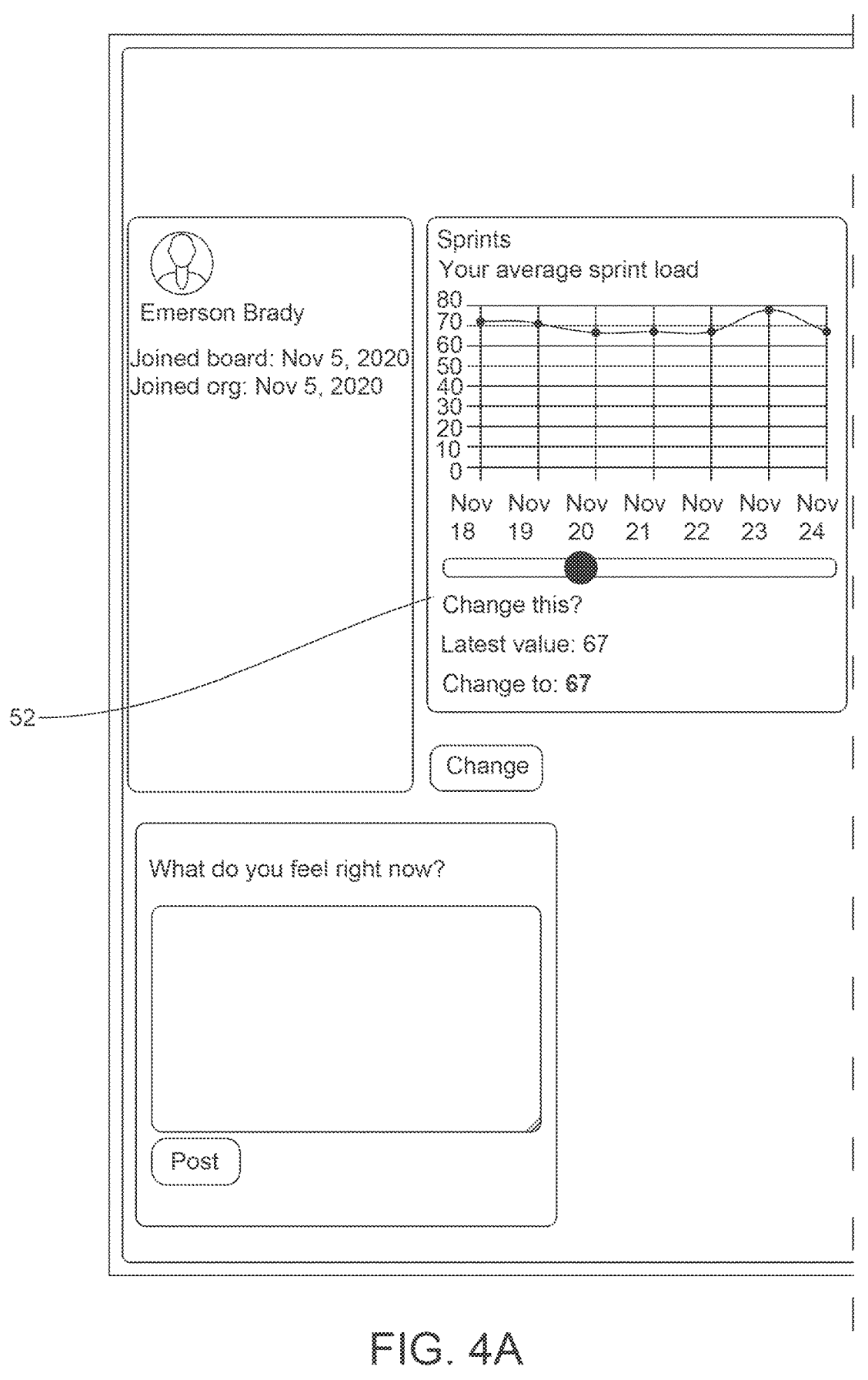
Figure 4B:
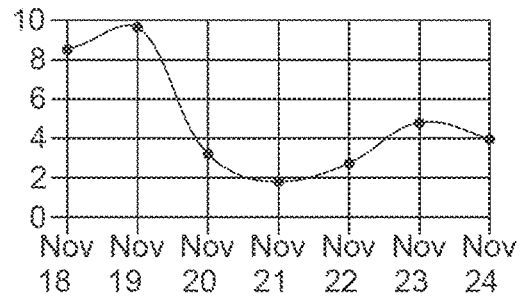
FIG. 4B shows a partial user dashboard of the user interface in the business management system, according to an embodiment.
Figure 4B:
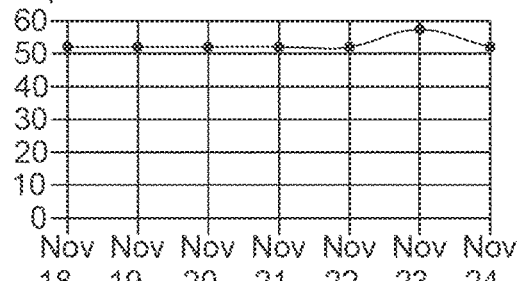
Figure 4B:
Figure 4B:
Figure 4C:
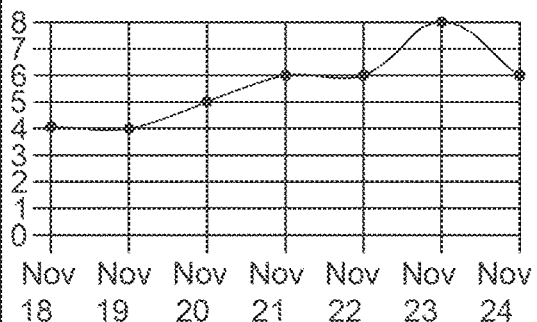
FIG. 4C shows a partial user dashboard of the user interface in the business management system, according to an embodiment.
Figure 4C:
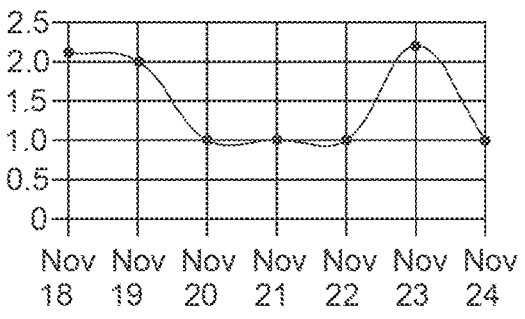

FIGS. 4A, 4B, and 4C show a user dashboard that is accessed by individual employees of an organization as well as supervisors and managers, and provides an opportunity for providing feedback on metrics, as depicted by numeral 52. These adjustments are averaged with the original system calculations and are fed into the machine learning model in order to learn and refine its results. Additionally, the dashboard provides social interaction opportunities that are tied to the issues in the project management system. This area is also a good place for pulse feedback, such as, how a member is feeling at the moment.

Figure 5B:
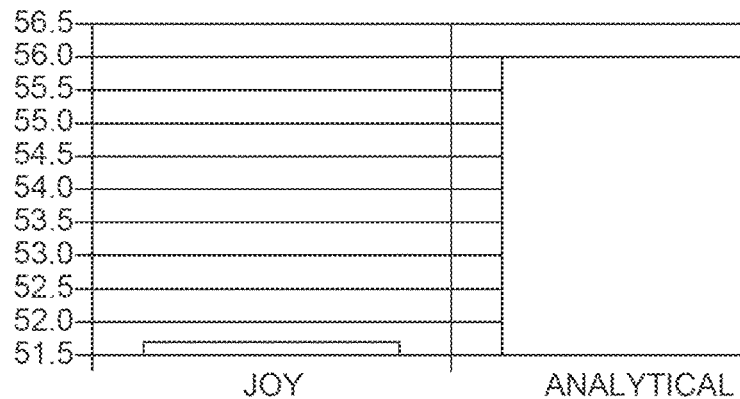
FIG. 5B shows a partial chat tone analysis dashboard of the user interface in the business management system, according to an embodiment.
Figure 5B:
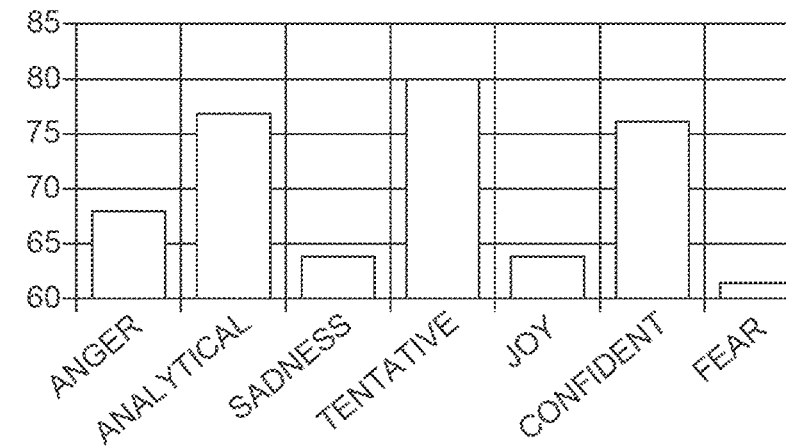
Figure 5C:
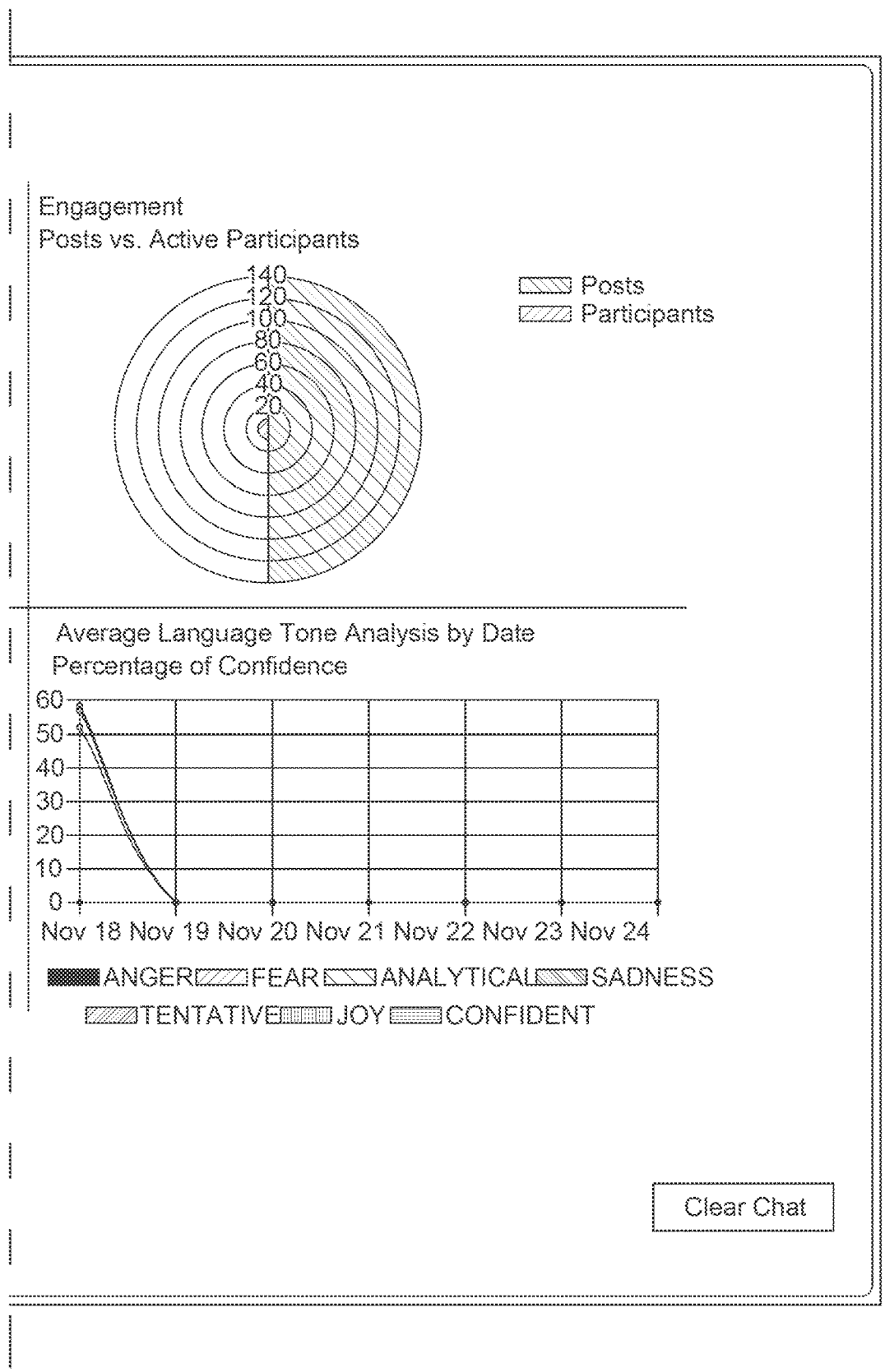
FIG. 5C shows a partial chat tone analysis dashboard of the user interface in the business management system, according to an embodiment.

The chat tone analysis dashboard shown in FIGS. 5A, 5B, and 5C provide tone analysis including "mood posts" on general company interactions on chat forums. Communication data is anonymized and is only used to provide a tone analysis of the organization over any given time period and to display trends over time. Individual messages, or information on their creators, are preferably not shared or collected.

Thus, the system and method of the embodiments provide a unique combination of estimating an employee engagement score as well as predicting an flight event risk status. The estimation of employee engagement score is achieved advantageously in an automated manner using data from business system platforms as key inputs. As noted herein, the business system platforms include commercially software that are readily available in the market. This makes the business management system very convenient to use as it can be a simple addition to existing set of tools while providing a more powerful and accurate outputs, namely, employee engagement score and flight event risk status. Also, as noted herein, employee engagement score is a real time estimation of an employee's engagement with a project, while flight event risk status is a predictive score.

While only certain features of the embodiments have been illustrated and described herein, many modifications and changes will occur to those skilled in the art. It is, therefore, to be understood that the appended claims are intended to cover all such modifications and changes as fall within the true spirit of the embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine including any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements includes one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. An employee engagement system to calculate employee engagement score and predict flight risk in an organization, the system comprising:
   a memory;
   a processor; the processor configured to provide:
      a business management system platform, the business management system platform configured to gather data about at least one employee and messages posted by the at least one employee in real-time;
      a tone analyzer to analyze a tone of the messages posted by the at least one employee; and
      a user interface that allows the at least one employee and an employer to visualize the employee engagement score, and the at least one employee to input additional feedback data based on the visualized employee engagement score, wherein:
   the processor is further configured to:
      receive the gathered data from the business management system platform;
      calculate the employee engagement score based on the received data;
      train a Machine Learning (ML) model based on the calculated employee engagement score;
      display the calculated employee engagement score on the user interface for the at least one employee to visualize;
      obtain the additional feedback data from the at least one employee, after the at least one employee reviews the calculated employee engagement score on the user interface;
      adjust the calculated employee engagement score based on the obtained additional feedback data;
      retrain the ML model based on the adjusted calculated employee engagement score;
      predict the flight risk of the at least one employee based on the retrained ML model; and
      determine a well being of a group in which the at least one employee works including other employees based on the obtained feedback and the analyzed tone of the messages.

2. The employee engagement system of claim 1, wherein the business management system platform is a cognitive analysis application incorporating Artificial Intelligence (AI), and
   the business management system platform includes one of a project management or a communication application.

3. The employee engagement system of claim 1, wherein the business management system platform is used to assess performance of an employee based on at least one of a number of tasks, average time taken for each task, complexity of each task, relationships with other team members, ability to meet deadlines, handling project loads, and combinations thereof.

4. The employee engagement system of claim 1, wherein the tone analyzer categorizes the tone of the messages as at least one of anger, analytical, sadness, tentative, joy, confident or fear.

5. The employee engagement system of claim 1, wherein the messages posted by an employee is at least one of an email message, chat message, project comments, or combinations thereof.

6. The employee engagement system of claim 1, wherein the flight risk is estimated using machine learning regression model.

7. The employee engagement system of claim 1, wherein the user interface is configured to allow the at least one employee to adjust the calculated employee engagement score based on the visualized employee engagement score.

8. A method of predicting a flight risk of an employee, the method comprising:
- receiving data about the employee from a business management system platform and messages inputted by the employee in real-time;
- analyzing a tone of the messages inputted by the employee within the business management system platform;
- calculating an employee engagement score for an employer and the employee to visualize based on the data received from the business management system platform;
- training a Machine Learning (ML) model based on the calculated employee engagement score;
- displaying the calculated employee engagement score on a user interface for the employee to visualize;
- obtaining additional feedback data from the employee, after the employee reviews the calculated employee engagement score;
- adjusting the calculated employee engagement score based on the obtained additional feedback data;
- retraining the ML model based on the adjusted calculated employee engagement score;
- predicting the flight risk of the employee based on the retrained ML model; and
- determining a well-being of a group in which the employee works including other employees based on the obtained additional feedback and the analyzed tone of the messages.

9. The method of claim 8, wherein the business management system platform is a cognitive analysis application and includes one of project management or communication applications.

10. The method of claim 8, wherein
- the data includes information from at least five categories including one of sprint, frustration, burden, difficulty, or strain, the sprint including an average time taken for each of the number of tasks, the frustration including a measurement of blockers for an assignment, the burden including a number of tasks the employee is assigned, the difficulty including a complexity of each task, and the strain including a measurement of a number of hours the employee is assigned, and further includes relationships with other team members, ability to meet deadlines, handling project loads, or combinations thereof, and
- the employee engagement score is calculated based on the at least five categories.

11. The method of claim 8, further comprising: analyzing the tone of messages posted on a business communication system received in real-time to categorize the tone of the messages.

12. The method of claim 11, wherein the tone of the messages is categorized as at least one of anger, analytical, sadness, tentative, joy, confident and fear during the analyzing of the tone of the messages.

13. The method of claim 11, wherein the messages posted is at least one of an email message, chat message, project comments, or combinations thereof.

14. The method of claim 8, wherein at least one of the calculated employee engagement score, the flight risk, or both is determined using machine learning regression model.

15. A non-transient computer readable medium for performing the method of claim 8.

* * * * *